(12) United States Patent
Suzuki

(10) Patent No.: US 8,651,469 B2
(45) Date of Patent: Feb. 18, 2014

(54) VIBRATION DAMPING DEVICE

(75) Inventor: Junichiro Suzuki, Kasugai-shi (JP)

(73) Assignee: Tokai Rubber Industries, Ltd., Komaki-shi, Aichi-ken (JP)

(*) Notice: Subject to any disclaimer, the term of this patent is extended or adjusted under 35 U.S.C. 154(b) by 191 days.

(21) Appl. No.: 13/362,887

(22) Filed: Jan. 31, 2012

(65) Prior Publication Data

US 2012/0235334 A1    Sep. 20, 2012

Related U.S. Application Data

(63) Continuation of application No. PCT/JP2011/056093, filed on Mar. 15, 2011.

(51) Int. Cl.
*F16F 7/00* (2006.01)

(52) U.S. Cl.
USPC ............. 267/141.1; 267/140.12; 267/140.3

(58) Field of Classification Search
USPC ............ 267/140, 153, 140.11–140.13, 267/140.2–140.4, 141.1; 188/378; 428/219, 428/517
See application file for complete search history.

(56) References Cited

U.S. PATENT DOCUMENTS

| | | | | |
|---|---|---|---|---|
| 4,278,726 A | * | 7/1981 | Wieme | 267/140.3 |
| 5,232,073 A | * | 8/1993 | Bronowicki et al. | 267/141.1 |
| 5,695,867 A | * | 12/1997 | Saitoh et al. | 428/219 |
| 5,858,521 A | * | 1/1999 | Okuda et al. | 428/219 |
| 2003/0035974 A1 | * | 2/2003 | Kazuno et al. | 428/517 |

FOREIGN PATENT DOCUMENTS

| | | |
|---|---|---|
| JP | 05-329886 A | 12/1993 |
| JP | 11-129284 A | 5/1999 |
| JP | 11-179756 A | 7/1999 |
| JP | 2001-310325 A | 11/2001 |
| JP | 2003-214494 A | 7/2003 |
| JP | 2005-325922 A | 11/2005 |
| JP | 2007-177827 A | 7/2007 |
| JP | 2007-263241 A | 10/2007 |
| JP | 2008-155581 A | 7/2008 |
| JP | 2008-157410 A | 7/2008 |

* cited by examiner

*Primary Examiner* — Melanie Torres Williams
(74) *Attorney, Agent, or Firm* — Westerman, Hattori, Daniels & Adrian, LLP

(57) ABSTRACT

A vibration damping device includes a vulcanized rubber molding and a resin molding integrally formed with the vulcanized rubber molding. The resin molding includes a sandwiched molding having a core layer and skin layers. The skin layers sandwich the core layer. The skin layer includes a resin composition (A) containing a first thermoplastic resin and an inorganic filler. The core layer includes a resin composition (B) containing a second thermoplastic resin and an inorganic filler. A volume ratio of the skin layers is 40 to 70% of the entire molding, and a bending modulus (E1) and a maximum bending strain ($\epsilon 1$) of the skin layers, and a bending modulus (E2) and a maximum bending strain ($\epsilon 2$) of the core layer satisfy the following expressions (1) and (2):

$$1 < (E1/\epsilon 1) < (E2/\epsilon 2) < 10 \quad (1)$$

$$\epsilon 1/\epsilon 2 > 1 \quad (2).$$

8 Claims, 2 Drawing Sheets

VIBRATION DAMPING DEVICE

BACKGROUND

1. Technical Field

The present disclosure relates to a vibration damping device. More specifically, the present disclosure relates to a vibration damping device for an automobile, which is used for an engine mount of the automobile, and the like.

2. Related Art

The following description sets forth the inventor's knowledge of related art and problems therein and should not be construed as an admission of knowledge in the prior art.

In the related art, automobiles, rail vehicles, and the like are respectively provided with a various types of vibration damping devices to prevent vibration or impact from being transferred to stiff components. For the vibration damping devices, a large number of devices made of metal/rubber composites have been studied and developed and have been used in practice. Such devices have been formed by bonding vulcanized rubber to a metal-made support member. Recently, vibration damping devices made of resin/rubber composites have been widely used as those for automobiles, especially as engine mounts thereof, to reduce the weight and manufacturing cost of the vibration damping devices. In the vibration damping devices, a lightweight resin support member (e.g., a resin bracket) made of a resin material is used instead of a traditional metal support member (e.g., a metal bracket).

In the abovementioned vibration damping device made of a resin/rubber composite, among various kinds of resin materials, resin with excellent properties, such as heat resistance and durability, is particularly selected and used as the resin for the lightweight resin support member (e.g., the resin bracket). Presently, the use of a polyamide resin as the material for the resin support member has been regarded as effective (see, for example, Japanese Patent Application Laid-Open No. 2003-214494). The reasons therefor include that polyamide resin is superior in properties of reinforcement with glass fibers, mold-injection properties during processing, and chemical resistant properties and that the manufacturing cost of the vibration damping device can be lowered by using a polyamide resin, and the like.

SUMMARY

A vibration damping device according to the present disclosure includes: a vulcanized rubber molding having a vibration isolating function; and a resin molding integrally formed with the vulcanized rubber molding and fixed to a base body while supporting the vulcanized rubber molding, wherein the resin molding includes a sandwiched molding having a core layer and skin layers sandwiching the core layer, a resin composition (A) included in the skin layers includes a first thermoplastic resin and an inorganic filler, a resin composition (B) included in the core layer includes a second thermoplastic resin and an inorganic filler, a volume ratio of the skin layers is in a range of 40 to 70% of the entire sandwiched molding, and a bending modulus (E1) of the skin layers, a maximum bending strain ($\epsilon$1) of the skin layers, a bending modulus (E2) of the core layer, and a maximum bending strain ($\epsilon$2) of the core layer satisfy the following expressions (1) and (2):

$$1 < (E1/\epsilon1) < (E2/\epsilon2) < 10 \quad (1)$$

$$\epsilon1/\epsilon2 > 1 \quad (2).$$

BRIEF DESCRIPTION OF THE DRAWINGS

The advantages of the invention will become apparent in the following description taken in conjunction with the drawings, wherein.

DESCRIPTION OF EMBODIMENTS

Figure 1:
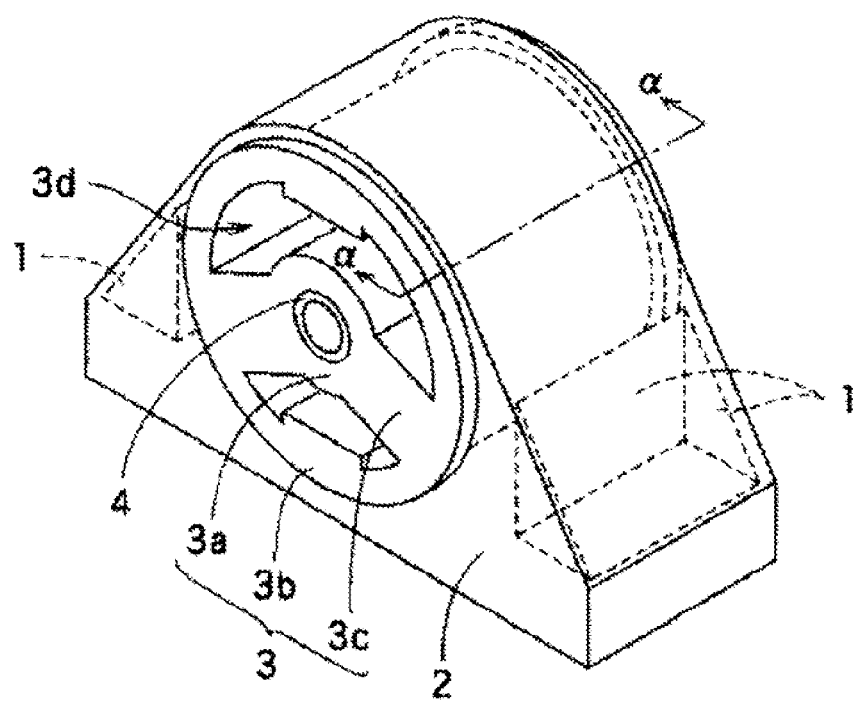
FIG. 1 is an external perspective view illustrating an embodiment of a vibration damping device of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In association with power-heightening and upsizing of engines, engine mounts for automobiles have been required to be resistant to high temperature and high load. Thus, resin brackets have been designed to be thick for preventing the resin brackets from being deteriorated by heat and for improving the strength thereof. However, thickening of the resin brackets tends to cause internal defects, such as voids and cracks, due to resin crystallization, large mold shrinkage (i.e., sink), and the like. Further, the thickened resin brackets may cause high residual stress. Therefore, the use of a thickened resin bracket may lead to a decrease in strength of an entire vibration damping device.

The present embodiment provides a vibration damping device being superior in strength as a whole.

To address the above issues, a vibration damping device of the present embodiment has the following structure.

The vibration damping device includes: a vulcanized rubber molding having a vibration isolating function; and a resin molding integrally formed with the vulcanized rubber molding and fixed to a base body while supporting the vulcanized rubber molding, wherein the resin molding includes a sandwiched molding having a core layer and skin layers sandwiching the core layer, a resin composition (A) included in the skin layers includes a first thermoplastic resin and an inorganic filler, a resin composition (B) included in the core layer includes a second thermoplastic resin and an inorganic filler, a volume ratio of the skin layers is in a range of 40 to 70% of the entire sandwiched molding, and a bending modulus (E1) of the skin layers, a maximum bending strain ($\epsilon$1) of the skin layers, a bending modulus (E2) of the core layer, and a maximum bending strain ($\epsilon$2) of the core layer satisfy the following expressions (1) and (2):

$$1 < (E1/\epsilon1) < (E2/\epsilon2) < 10 \quad (1)$$

$$\epsilon1/\epsilon2 > 1 \quad (2).$$

The inventors have intensively studied for addressing the above situations. As a result, the present inventors have found that the strength of an entire vibration damping device can be improved by using a resin molding (i.e., a resin bracket) that includes a sandwiched molding having: a core layer containing a specified resin composition (B); and skin layers each containing a specified resin composition (A) and sandwiching the core layer, where a volume ratio of the skin layers is in a specified range. Thus, the present inventors have attained the technology of the present embodiment.

The vibration damping device of the present embodiment uses the resin molding (i.e., the resin bracket) that includes the sandwiched molding having the core layer containing the specified resin composition (B) and the skin layers containing the specified resin composition (A) and sandwiching the core layer, where the volume ratio of the skin layers is in the specified range. Therefore, an effect of improving the strength of the entire vibration damping device can be obtained. Further, the vibration damping device of the present embodiment is also excellent in heat resistance.

When both a first thermoplastic resin and a second thermoplastic resin are polyamide resins, the strength of the entire vibration damping device is further improved.

Further, when an inorganic filler includes at least one of glass fibers and carbon fibers, the strength of the entire vibration damping device is particularly improved.

Furthermore, the strength of the entire vibration damping device is further improved when the skin layer includes glass fibers (x) of 100 to 500 μm in average fiber length and the core layer includes glass fibers (y) of 0.5 to 5 mm in average fiber length, which is longer than the average fiber length of the glass fibers (x).

In the following, the vibration damping device according to the present embodiment will be described in detail. Here, the present disclosure is not limited to the present embodiment.

Figure 2:
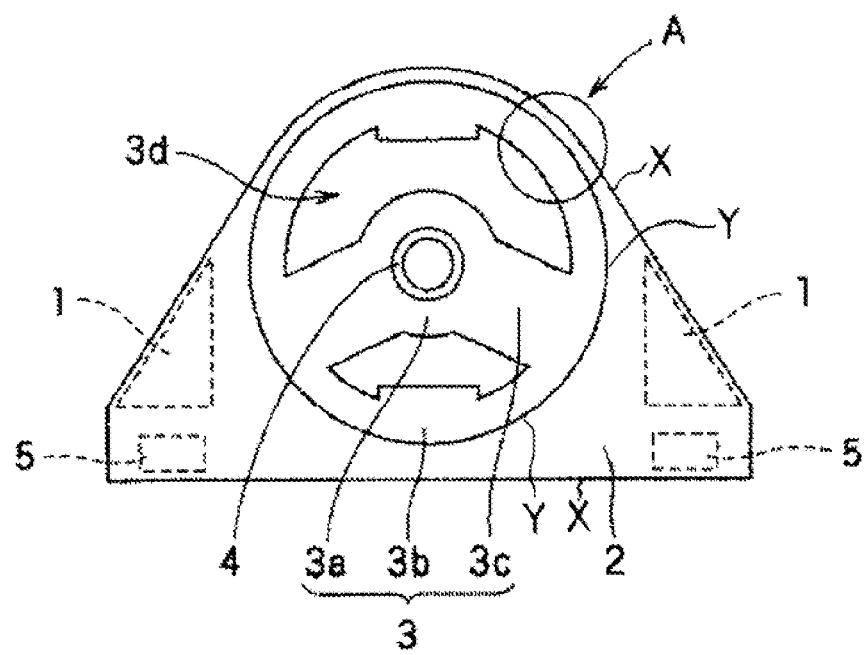
FIG. 2 is a front view illustrating the vibration damping device.

FIGS. 1 and 2 illustrate an engine mount (i.e., the present engine mount) as an exemplary vibration damping device according to the present embodiment. Here, the vibration damping device according to the present embodiment is not limited to the present engine mount. In the present engine mount, a rubber elastic body (i.e., a vulcanized rubber molding) 3 having a vibration isolating function is supported by a resin bracket (i.e., a resin molding) 2. That is, the present engine mount includes the generally cylindrical rubber elastic body 3, the resin bracket 2, and a cylindrical hardware fitting 4. The rubber elastic body 3 is intimately joined to the outer peripheral surface of the cylindrical hardware fitting 4. The resin bracket 2 covers the outer peripheral surface of the rubber elastic body 3 as being intimately joined to the outer peripheral surface of the rubber elastic body 3. The present engine mount is attached to a base body of a vehicle body and the like with the resin bracket 2.

Figure 3:
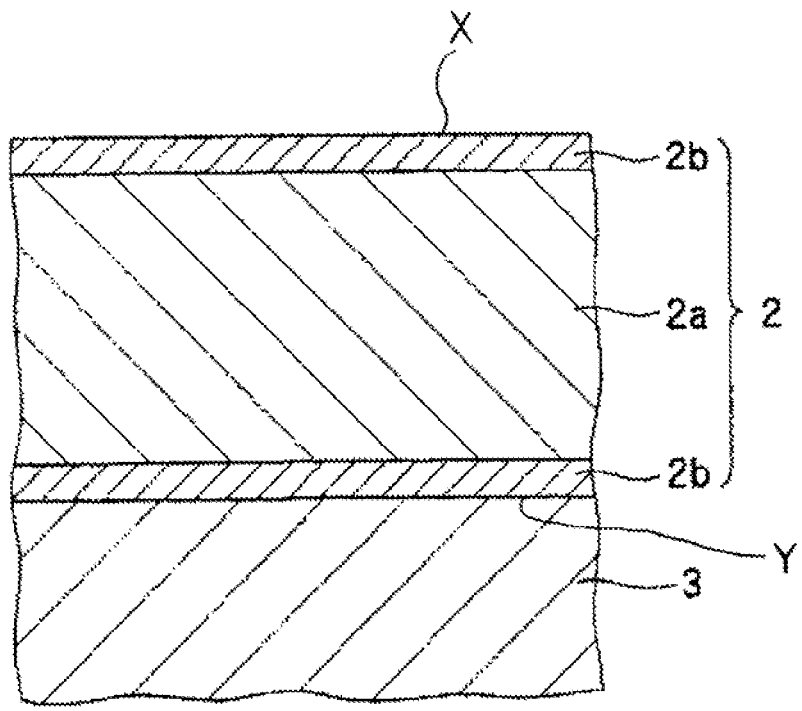
FIG. 3 is an enlarged partial cross-sectional view as sectioning part A surrounded by a circle in a direction of arrow $\alpha$ in the vibration damping device depicted in FIG. 2.

FIG. 3 is a partial cross-sectional view illustrating a section as sectioning part A surrounded by a circle in FIG. 2 in a direction of arrow α (see FIG. 1). As illustrated in FIG. 3, in the present engine mount, the resin bracket 2 includes a sandwiched molding with a core layer 2a and skin layers 2b sandwiching the core layer 2a. The section from a front side (an outer peripheral side) X to an inner peripheral side Y (see FIG. 2) of the resin bracket 2 has a sandwich structure as illustrated in FIG. 3. In this structure, the core layer 2a is sandwiched by the skin layers 2b from both sides.

Describing in more detail for the present engine mount, concave portions 1 are respectively arranged at inclined portions on the opposite lateral sides of the resin bracket 2 as illustrated in FIGS. 1 and 2. With this structure, thickening of the inclined portions is prevented. Therefore, occurrence of internal defects due to the thickening is prevented. Further, nuts 5 are respectively embedded at four corners of a bottom portion (i.e., a lower portion in FIG. 2) of the resin bracket 2. The rubber elastic body 3 includes an inner cylindrical portion 3a, an outer cylindrical portion 3b and connection portions 3c. The inner cylindrical portion 3a is intimately joined to the cylindrical hardware fitting 4. The outer cylindrical portion 3b is intimately joined to the resin bracket 2. The inner cylindrical portion 3a and the outer cylindrical portion 3b are connected at two positions with the connection portions 3c. Hollow portions 3d are formed as being surrounded thereby.

The present engine mount is arranged as being sandwiched between the vehicle body (not illustrated) and an engine (i.e., a vibrating body, not illustrated). That is, a part of the resin bracket 2 (e.g., the bottom portion of the resin bracket 2 in FIG. 2) is fixed to the vehicle body (i.e., the base body). The fixing is performed by screwing bolts (not illustrated) into the nuts 5 embedded in the resin bracket 2. Then, the cylindrical hardware fitting 4 is fixed to an engine side bracket (not illustrated). In this manner, the present engine mount is arranged as being sandwiched between the vehicle body and the engine. This arrangement allows the present engine mount to exert the vibration isolating function. That is, vibration of the engine is hardly transmitted to the vehicle body because of being attenuated by the rubber elastic body 3 intimately joined to the cylindrical hardware fitting 4.

Here, the present engine mount satisfies following expressions (1) and (2) with E1, $\epsilon$1, E2 and $\epsilon$2 respectively denoting a bending modulus of the skin layers 2b, a maximum strain (i.e., a strain at the time of maximum bending strength) of the skin layers 2b, a bending modulus of the core layer 2a, and a maximum bending strain (i.e., a strain at the time of maximum bending strength) of the core layer 2a. Details will be described later.

$$1 < (E1/\epsilon1) < (E2/\epsilon2) < 10 \tag{1}$$

$$\epsilon1/\epsilon2 > 1 \tag{2}$$

Next, formation materials and the like of the present engine mount will be described. First, the formation materials of the resin bracket 2 (i.e., the sandwiched molding) are described.

A resin composition (A) that includes a first thermoplastic resin and inorganic filler is used as the formation material of the skin layers 2b of the resin bracket 2.

Meanwhile, a resin composition (B) that includes a second thermoplastic resin and inorganic filler is used as a formation material of the core layer 2a of the resin bracket 2.

Examples of the first thermoplastic resin and the second thermoplastic resin include a polyamide resin, polyethylene terephthalate (PET), polybutylene terephthalate (PBT), polypropylene, syndiotactic polystyrene (SPS), polyacetal, polysulfone, polyphenylene sulfide (PPS), polyether sulfone, polyphenylene ether (PPE), polyether ketone, polycarbonate, and polyarylate. Among them, from viewpoints of molding processability, heat resistance, economy, and chemical resistance, the first and second thermoplastic resins are preferably any of crystalline resins, such as the polyamide resin, polyethylene terephthalate, polybutylene terephthalate, and polyphenylene sulfide, and more preferably the polyamide resin.

Here, it is preferable that similar kinds of thermoplastic resin be used for the first thermoplastic resin and the second thermoplastic resin to obtain adhesiveness between boundary faces of the skin layers 2b and the core layer 2a.

Examples of the polyamide resin include Polyamide 6, Polyamide 46, Polyamide 66, Polyamide 610, Polyamide 612, Polyamide 116, Polyamide 11, Polyamide 12, Polyamide 92, Polyamide 99, Polyamide 912, Polyamide 1010, Polyamide 6I, Polyamide 6T, Polyamide 9T, Polyamide MXD6, Polyamide 6T/61, Polyamide 6/6T, Polyamide 6/6I, Polyamide 66/6T, Polyamide 66/6I, a polyamide copolymer including at least two polyamide constituents (i.e., monomers) of which structures are different from one another among polyamide constituents constituting the polyamide resins, and mixtures thereof. Among them, more preferably, the first and second thermoplastic resins are resins each containing Polyamide 6 or Polyamide 66 alone or containing Polyamide 6 and Polyamide 66 in combination from viewpoints of strength, formability, and economy.

Here, material capable of being used for strengthening a thermoplastic resin can be used as the inorganic filler. Specific examples of the material include calcium carbonate, zinc carbonate, wollastonite, silica, alumina, magnesia oxide, calcium silicate, sodium aluminate, sodium aluminosilicate, magnesium silicate, glass balloon, carbon black, metal fibers, metal whisker, ceramic whisker, potassium titanate whisker, boron nitride, graphite, glass fibers, carbon fibers, and laminated silicates such as talc, kaolin, mica, synthesized fluorine mica, montmorillonite, vermiculite, smectite, zeolite, and hydrotalcite. These are used alone or in combination of two or more. Among them, from a viewpoint of obtaining an excellent reinforcement effect, the inorganic filler is preferably glass fibers, carbon fibers, or laminated silicates, and more preferably the glass fibers or the carbon fibers.

In the present engine mount, it is preferable that the skin layers 2b include the glass fibers (x) of 100 to 500 µm in average fiber length and that the core layer 2a includes the glass fibers (y) of 0.5 to 5 mm in average fiber length as being longer than the average fiber length of the glass fibers (x).

First, description is given on the glass fibers (x). For example, the glass fibers (x) are made of glass material, such as electrical glass (E-glass), chemical glass (C-glass), alkali glass (A-glass), high strength glass (S-glass), and alkali-resistant glass.

The glass fibers (x) are manufactured by a known method of manufacturing glass fibers. For example, the glass fibers (x) can be obtained by melt-spinning the glass material such as E-glass.

The average fiber length (L) of the glass fibers (x) is preferably in the range of 100 to 500 µm, more preferably in the range of 150 to 500 µm, and most preferably in the range of 200 to 500 µm.

When the average fiber length of the glass fibers (x) is too short, the reinforcement effect due to the glass fibers (x) is decreased. Thus, bending strength of the molding that includes the glass fibers (x) tends to be decreased under ordinary temperature environment and high temperature environment. When the average fiber length of the glass fibers (x) is too long, the maximum bending strain tends to be lessened.

Here, the average fiber length of the glass fibers (x) denotes an average fiber length of glass fibers in the skin layers 2b of the sandwiched molding.

With a later-mentioned method of manufacturing the sandwiched molding, the resin composition is obtained by melt-kneading a thermoplastic resin (e.g., polyamide resin) and the glass fibers (x). The average fiber length of the glass fibers (x) can be controlled by adjusting kneading conditions such as screw dimensions, screw rotation, and discharge quantity when melt-kneading the glass fibers (x) and a thermoplastic resin having specified melt viscosity.

The glass fibers (x) are preferably used in a state of so-called chopped strands if needed. The chopped strands are obtained by collecting glass fiber strands bound by a binder and cutting them to have constant length.

From a viewpoint of adhesiveness with matrix resin and even distribution, the binder may be a coupling agent, for example. Examples of the coupling agent include a silane coupling agent, a titanium-based coupling agent, and a zirconia-based coupling agent. Among them, the coupling agent is preferably the silane coupling agent, and is more preferably an amino-silane coupling agent or a grycidyl-silane coupling agent.

From a viewpoint of maintaining the bending strength under ordinary temperature environment and high temperature environment more effectively, the fiber diameter (D) of the glass fibers (x) is preferably in the range of 4 to 13 µm, and more preferably in the range of 7 to 11 µm. Here, the fiber diameter denotes a glass fiber diameter of each glass filament (i.e., a monofilament).

From a viewpoint of suppressing strain of the molding by further improving impact resistance under environment of low temperature and mechanical strength under ordinary temperature environment and high temperature environment, a value calculated by (the average fiber length L)/(the fiber diameter D) of the glass fibers (x) is preferably in the range of 8 to 125, and more preferably in the range of 13 to 60.

Next, description is given on the glass fibers (y).

The average fiber length of the glass fibers (y) in the core layer 2a may be longer than the average fiber length of the glass fibers (x) in the skin layers 2b. In this case, the long fiber glass tends to be oriented in the flow direction at the boundary of the core layer 2a to the skin layers 2b. Further, flexibility of the skin layers 2b is improved and stiffness of the core layer 2a is improved. As a result, flexibility of the obtained molding is improved. Furthermore, it is possible to reduce stress of the molding against external force (i.e., load). Therefore, the molding becomes sufficiently resistant to the load. As a result, it is possible to suppress a decrease in bending strength under ordinary temperature environment and high temperature environment.

The average fiber length (L) of the glass fibers (y) is preferably in the range of 0.5 to 5 mm, and more preferably in the range of 1 to 4 mm. When the average fiber length of the glass fibers (y) is too short, mechanical characteristics of the molding that includes the glass fibers (y) are decreased under high temperature environment of 100° C. or higher. In particular, there is a tendency that a decrease in bending strength becomes large. When the average fiber length of the glass fibers (y) is too long, flowability of the glass fibers (y) becomes worse during molding. Therefore, there is a tendency that voids and cracks are generated in the molding that includes the glass fibers (y) and that the bending strength thereof is decreased.

Here, the average fiber length of the glass fibers (y) denotes an average fiber length of glass fibers in the core layer 2a of the sandwiched molding.

With the later-mentioned method of manufacturing the sandwiched molding, core layer-forming pellets are formed by melt-kneading various constituents to be included in the core layer 2a. The average fiber length of the glass fibers (y) can be controlled by adjusting the length of pellets. For example, when the length of the core layer-forming pellets is set long, the average fiber length of the glass fibers (y) in the core layer 2a becomes long. When the length of the core layer-forming pellets is set short, the average fiber length of the glass fibers (y) in the core layer 2a becomes short.

The pellets may be prepared when the core layer 2a is formed. Here, from a viewpoint of maintaining the glass fiber length in the molding long, the pellet length of the core layer-forming pellets is preferably in the range of 3 to 20 mm, and more preferably in the range of 5 to 15 mm. Normally, the pellet length is approximately the same as the average fiber length of the glass fibers (y) in the pellet. More specifically, the average fiber length of the glass fibers (y) in the pellet becomes equal to the pellet length when the glass fibers (y) are arranged in the pellet in parallel to the longitudinal direction of the pellet. When the glass fibers (y) are arranged obliquely to the longitudinal direction of the pellet, the average fiber length becomes slightly longer than the pellet length. When the glass fibers (y) are broken in the pellet, the average fiber length becomes slightly shorter than the pellet length.

Here, the pellet length denotes the maximum length of the pellets. In the present embodiment, the pellet length can be obtained as follows. First, a length of each of thirty pellets, which are arbitrarily selected, is measured with a caliper. Subsequently, ten measured values are arbitrarily selected. Then, an average of largest three values among the selected measured values is to be the pellet length.

From a viewpoint of maintaining the fiber length long, the glass fibers (y) are preferably used in a state of glass roving for manufacturing the core layer-forming pellets. The glass roving denotes winding of several tens of strands obtained by collecting 100 to 200 glass filaments (i.e., monofilaments), cylindrical winding of strands obtained by bundling several thousand glass filaments, or the like.

Material of the glass fibers (y) may be, for example, similar to the material of the abovementioned glass fibers (x). Except for difference in the average fiber length and other sizes, the glass fibers (y) can be manufactured in a manner similar to the glass fibers (x).

From a viewpoint of maintaining the bending strength under ordinary temperature environment and high temperature environment more effectively, the fiber diameter (D) of the glass fibers (y) is preferably in the range of 11 to 23 μm, and more preferably in the range of 11 to 17 μm.

From a viewpoint of maintaining impact resistance under environment of low temperature and mechanical strength under ordinary temperature environment and high temperature environment more effectively, a value calculated by (average fiber length L)/(fiber diameter D) of the glass fibers (y) is preferably in the range of 40 to 800, and more preferably in the range of 60 to 600.

It is preferable that surface treatment be performed on the glass fibers (y) with a coupling agent. The surface treatment has an advantage that impregnation of a thermoplastic resin (i.e., polyamide resin) to the glass fibers (y) is achieved relatively easily.

A coupling agent similar to the coupling agent included in the above-mentioned binder of the glass fibers (x) may be used as the coupling agent.

Here, in the present embodiment, the resin composition (A) in the skin layers 2b and the resin composition (B) in the core layer 2a may respectively include additives if needed in addition to the thermoplastic resin and the inorganic filler. Examples of the additive include a heat stabilizer, an antioxidant, a crystal nucleating agent, a reinforcing agent, a pigment, a color protecting agent, a weatherproofing agent, a plasticizing agent, a release agent, and a lubricating agent. The additives may be separately added to the skin layer forming pellets and/or the core layer-forming pellets before mold processing. Alternatively, the additives may be mixed with pellets at the time of mold processing.

Examples of the heat stabilizer or the antioxidant include hindered phenols, phosphorous compounds, hindered amines, sulfur compounds, copper compounds, alkali metal halogenides, and mixtures thereof. Further, for example, the crystal nucleating agent is talc.

In a case that the above additives are added to the resin composition (A) included in the skin layers 2b, the total content of the additives is preferably 5% by mass or lower relative to the total amount of resin composition. Further, in a case that the above additives are added to the resin composition (B) included in the core layer 2a, the total content of the additives is preferably 5% by mass or lower relative to the total amount of resin composition.

As described above, the present engine mount satisfies the following expressions (1) and (2) where E1, $\epsilon$1, E2 and $\epsilon$2 respectively denote a bending modulus of the skin layers 2b, a maximum strain (i.e., a strain at the time of maximum bending strength) of the skin layers 2b, a bending modulus of the core layer 2a, and a maximum bending strain (i.e., a strain at the time of maximum bending strength) of the core layer 2a.

$$1<(E1/\epsilon1)<(E2/\epsilon2)<10 \tag{1}$$

$$\epsilon1/\epsilon2>1 \tag{2}$$

<Regarding Expression (1)>

When a value of (E1/$\epsilon$1) is too small, mechanical strength of the entire sandwiched molding is decreased. In particular, under high temperature environment of 100° C. or higher, the mechanical strength of the entire sandwiched molding is remarkably decreased. When a value of (E2/$\epsilon$2) is too large, the mechanical strength of the entire sandwiched molding is decreased.

It is preferable that (E1/$\epsilon$1) and (E2/$\epsilon$2) satisfy relation of the following expression. When the value of (E1/$\epsilon$1) is too large, mechanical strength of the entire sandwiched molding tends to be decreased. Further, when the value of (E2/$\epsilon$2) is too small, the mechanical strength of the entire sandwiched molding tends to be decreased.

$$1<(E1/\epsilon1)<7$$

$$3\le(E2/\epsilon2)<10$$

<Regarding Expression (2)>

When a value of ($\epsilon$1/$\epsilon$2) is too small, the skin layers 2b sandwiching the core layer 2a become likely to be broken when external force is applied to the sandwiched molding. Accordingly, the mechanical strength of the entire sandwiched molding is decreased.

In the present engine mount, the maximum strain $\epsilon$1 of the skin layers 2b is preferably in the range of 2.0 to 6.0%, and more preferably in the range of 2.5 to 5.0%. Meanwhile, the maximum strain $\epsilon$2 of the core layer 2a is preferably in the range of 1.5 to 5.0%, and more preferably in the range of 1.5 to 4.0%.

Further, in the present engine mount, the volume ratio of the skin layers 2b is in the range of 40 to 70%, preferably in the range of 45 to 65%, relative to the entire resin bracket 2 (i.e., the sandwiched molding). When the volume ratio of the skin layers 2b is too low, the mechanical strength is decreased. When the volume ratio of the skin layers 2b is too high, the mechanical strength under high temperature environment, especially of 100° C. or higher, is remarkably decreased. By setting the volume ratio of the skin layers 2b into the range of 40 to 70% as described above, thicknesses of the skin layers 2b and the core layer 2a included in the resin bracket 2 can be set to preferable thicknesses and/or even thicknesses respectively.

The sandwiched molding such as the resin bracket 2 in the present engine mount can be manufactured by supplying the skin layer forming pellets and the core layer-forming pellets respectively as primary material and secondary material in a so-called sandwich molding method.

For example, a preferable method of manufacturing the skin layer forming pellets or the core layer-forming pellets is a method of kneading by using a double-axis extrusion kneader. Describing in more detail, a thermoplastic resin (e.g., polyamide or the like) is fed to an upstream portion of a cylinder and inorganic filler (e.g., glass fibers or the like) is side-fed to an intermediate portion of the cylinder. Subsequently, the discharged strand-shaped resin composition is drawn from a dice. The strand-shaped resin composition is cut with a pelletizer after being cooled and solidified, so that the pellets can be obtained. Such a method is economically preferable. When the abovementioned additives are added, the additives may be added to the skin layer forming pellets and/or the core layer-forming pellets previously and separately. Alternatively, the additives may be mixed with the pellets at the time of molding.

Examples of the sandwich molding method include a sandwich molding method using an injection molding method.

Description is specifically given on a case that the skin layer forming pellets are used as the primary material and the core layer-forming pellets are used as the secondary material in the sandwich forming method using the injection molding method. First, the molten primary material is injected into a mold. Then, with a lapse of time, the molten secondary material is injected to the mold. At that time, injection of the primary material may be halted or the primary material may be injected along with the secondary material. Subsequently, injection of the secondary material is halted and the primary material is injected (once again), and then, the gate is closed with the primary material. As a result, the secondary material flows within the molten primary material in the mold. Thus, the primary material is flattened out to form the skin layers 2b. Since the gate is closed with the primary material as well, the primary material is formed on the entire surface of the molding. Lastly, the material in the mold is sufficiently cooled and solidified. In this manner, the sandwiched molding can be obtained. The sandwiched molding obtained in this manner has a sandwich structure of the primary material (i.e., the skin layers 2b) and the secondary material (i.e., the core layer 2a), where the primary material sandwiches (or wraps) the secondary material.

Next, the formation material of the rubber elastic body 3 of the present engine mount will be described.

It is preferable that rubber elastic body material (i.e., a rubber composition) for forming the rubber elastic body 3 have an excellent vibration isolating function. Examples of the rubber composition include natural rubber (NR), butadiene rubber (BR), styrene butadiene rubber (SBR), isoprene rubber (IR), acrylonitrile butadiene rubber (NBR), carboxyl denatured NBR, chloroprene rubber (CR), ethylene propylene rubber (EPM, EPDM), maleic denatured EPM, butyl rubber (IIR), halogenated IIR, chlorosulfonated polyethylene (CSM), fluoro-rubber (FKM), acrylic rubber, and epichlorohydrin rubber. These are used alone or in combination of two or more.

Here, the rubber composition is appropriately blended, if needed, with a reinforcing agent such as carbon black, a vulcanizing agent, a vulcanizing accelerator, a lubricating agent, an auxiliary agent, a plasticizing agent, and an anti-aging agent.

Next, a process of manufacturing the present engine mount illustrated in FIGS. 1 to 3 will be described. First, the cylindrical hardware fitting 4 is prepared and adhesive or the like is applied to the outer peripheral surface (i.e., a portion to be in close contact with the rubber elastic body 3). Subsequently, the cylindrical hardware fitting 4 is placed at a predetermined position in the mold for the rubber elastic body 3. Then, rubber elastic body material is injected into the mold. Subsequently, the rubber elastic body material is vulcanized under predetermined conditions (e.g., at 150° C. for 30 min) Thus, the rubber elastic body 3 integrated with the cylindrical hardware fitting 4 can be obtained.

Figure 4:
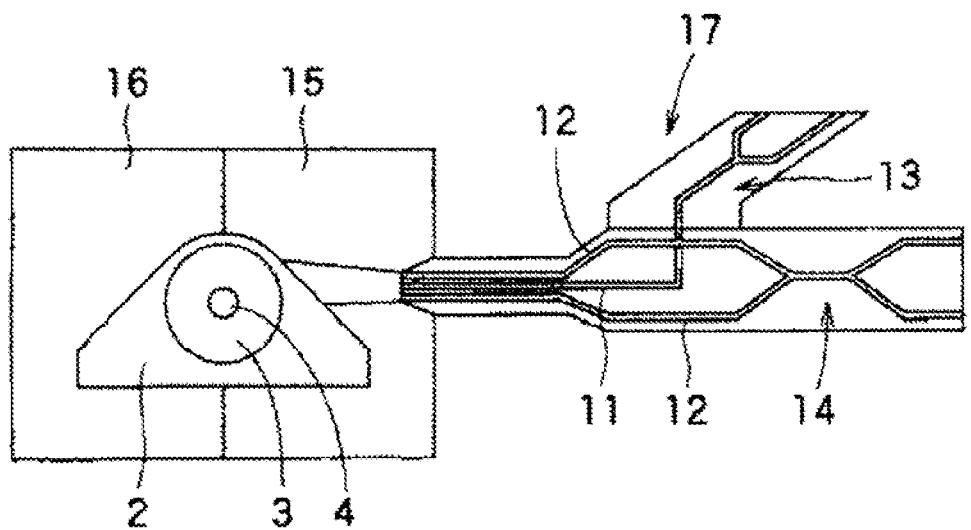
FIG. 4 is a schematic view illustrating a part of a process of manufacturing the vibration damping device of the present disclosure.

Subsequently, as illustrated in a structural view of FIG. 4, a mold machine (i.e., an injection mold machine for sandwich molding) 17 is prepared for molding the resin bracket 2. The mold machine 17 is provided with a nozzle having a double-structure with a core layer nozzle 11 and a skin layer nozzle 12, where the skin layer nozzle 12 is coaxially arranged outside the core layer nozzle 11. Then, adhesive or the like is applied to an outer peripheral portion (i.e., a portion to be in close contact with the resin bracket 2) of the rubber elastic body 3 in FIG. 2. Subsequently, these structural components and the nuts 5 are placed in positions in molds 15 and 16 illustrated in FIG. 4. In FIG. 4, the mold 15 serves as a fixed mold and the mold 16 serves as a movable mold. Then, the pellets for the resin composition (A) being the skin layer material are injected into cavities (i.e., mold space) of the molds 15 and 16 from a skin layer cylinder 14 via the skin layer nozzle 12. As a result, the skin layers 2b are formed at an inner wall face constituting the cavities of the molds 15 and 16 and the outer peripheral portion of the rubber elastic body 3. Immediately thereafter, the pellets for the resin composition (B) being the core layer material are injected into the cavities of the molds 15 and 16 from a core layer cylinder 13 via the core layer nozzle 11. As a result, the core layer 2a is formed while being integrated with the skin layers 2b. Thus, the molding is completed. Subsequently, the movable mold 16 is detached from the fixed mold 15. In this manner, the present engine mount as illustrated in FIG. 2 can be obtained. A section of the resin bracket 2 of the present engine mount has a sandwich structure as illustrated in FIG. 3. In this structure, the outer peripheral portion of the core layer 2a is covered with the skin layer 2b.

Here, the order of manufacturing the respective members in the process of manufacturing is not limited to the above manufacturing example. For example, it is also possible to apply adhesive to the resin bracket 2 after molding the resin bracket 2 and to vulcanize and mold the rubber elastic body 3 thereafter.

In the present engine mount, the thickness of the core layer 2a of the resin bracket 2 is normally in the range of 2 to 20 mm, and preferably in the range of 2.5 to 12 mm. The thickness of the skin layers 2b is normally in the range of 0.5 to 8 mm, and preferably in the range of 1 to 6 mm.

In the above, description has been given on the present engine mount which is an example of the vibration damping device according to the present embodiment. The vibration damping device according to the present embodiment may be used in applications other than an engine mount. For example, the vibration damping device according to the present embodiment may be used for a transmission mount, a body mount, a cab mount, a member mount, a differential mount, a con rod, a torque rod, a strut bar cushion, a center bearing support, a torsional damper, a steering rubber coupling, a tension rod bush, a bush, a bound stopper, an FF engine roll stopper, a muffler hanger, a stabilizer link rod, a radiator support, a control arm, a suspension arm, and the like for vehicles such as automobiles. Further, the vibration damping device according to the present embodiment may be used as a vibration damping device for other than vehicles such as automobiles. Shapes of the vibration damping device according to the present embodiment may be appropriately modified in accordance with an application.

EXAMPLES

Next, examples of the vibration damping device according to the present embodiment will be described along with comparative examples. However, the vibration damping device according to the present embodiment is not limited to the examples. To begin with, before manufacturing the examples and the comparative examples, following materials were prepared as the skin layer material and the core layer material for the resin bracket.

[Thermoplastic Resin]

<PA66 (Polyamide 66)>

E2000 manufactured by Unitika Ltd.

<PA12 (Polyamide 12)>

AESNTL manufactured by Arkema Corporation

<PA6T (denatured polyhexamethylene terephthalic amide)>

A3000 manufactured by Mitsui Chemicals INC.

[Inorganic Filler]

<Glass fibers (x) (short fibers)>

Chopped strand (Product name: CS03T275H) manufactured by Nippon Electric Glass Co., Ltd. (10 μm in fiber diameter and 3 mm in average fiber length) (surface-treated with aminosilane coupling agent)<

<Glass fibers (y) (long fibers)>

Glass roving (sample) (13 μm in fiber diameter and 3500 m in fiber-winding length) (surface-treated with aminosilane coupling agent)<

<Carbon fibers>

TR06NEB4J manufactured by Mitsubishi Rayon Co., Ltd. (7 μm in fiber diameter)

Next, the pellets of the skin layer material and the pellets of the core layer material were prepared by using the above materials.

Manufacturing Example 1

A co-rotation twin screw extruder (TEM37BS manufactured by Toshiba Machine Co., Ltd.) was used for preparing the pellets. A main hopper for feeding main raw material and a continuous quantitative feeder (manufactured by Kubota Corporation) for quantitatively feeding the main raw material to the main hopper are disposed at an upstream portion of the co-rotation twin screw extruder. A side-feeder for feeding auxiliary material is disposed at an intermediate portion of the extruder. Further, a cooling water bath and a pelletizer are disposed at a downstream portion of the extruder.

In manufacturing example 1, extrusion temperature of the co-rotation twin screw extruder was set in the range of 270 to 300° C. PA66 as the thermoplastic resin being the main raw material was fed by the continuous quantitative feeder to the main hopper disposed at the upstream portion of the co-rotation twin screw extruder to be 65 parts by mass. Meanwhile, the glass fibers (x) were fed to the side feeder disposed at the intermediate portion of the co-rotation twin screw extruder to be 35 parts by mass. Then, the PA66 and the glass fibers (x) were melt-kneaded at a screw rotation speed of 300 rpm. The blend ratio between the PA66 and the glass fibers (x) was adjusted by controlling the ratio between feeding speed of the main raw material by the continuous quantitative feeder and the side feeding rate of the auxiliary material by the side feeder. Then, the strand-shaped resin composition was drawn while the resin composition including PA66 and the glass fibers (x) was discharged from the dice at a discharge amount of 35 kg/h. Further, the resin composition was cooled and solidified by passing the resin composition through a cooling water bath. Subsequently, the pellets of 3 mm in length were obtained by cutting the resin composition with the pelletizer. Here, the resin temperature of the resin composition at the time of being discharged from the dice was 290° C.

Manufacturing Examples 2 to 7 and 9

Here, the pellets were prepared according to manufacturing example 1 except that constituents indicated in following Table 1 were blended in rates as indicated in this table.

Manufacturing Example 8

Here, a co-rotation twin screw extruder (TEM37BS manufactured by Toshiba Machine Co., Ltd.) having an impregnation die box attached to a distal end thereof was used. The extrusion temperature of the co-rotation twin screw extruder was set in the range of 280 to 300° C. and then raised to this temperature. Then, molten polyamide 66 was fed to the impregnation die box by the co-rotation twin screw extruder at a screw speed of 200 rpm and a feeding amount of 15 kg/h. The molten polyamide 66 was heated while being maintained in a molten state in the impregnation die box.

Meanwhile, the glass fibers (y), which are glass fibers (i.e., glass roving) including 800 glass fibers of 13 μm in fiber diameter, were introduced into the impregnation die box from a side of the box at a predetermined rate. The glass roving was impregnated with the molten resin by passing the glass roving through the molten resin in the box while being sandwiched by impregnation rollers. The resin-impregnated roving discharged from the impregnation box had a resin temperature of 280° C.

Then, the strand-shaped resin-impregnated roving was drawn from a feed roller located at the downstream side of a resin bath. The resin-impregnated roving was cooled and solidified by passing the resin-impregnated roving through the water bath, followed by cutting with the pelletizer. Cutter rotation speed of the pelletizer was adjusted to obtain pellets with a pellet length of 10 mm. In this manner, the pellets having the pellet length of 10 mm were obtained.

For preparing the pellets, the blend rate of Polyamide 66 was set to be 65 parts by mass and the blend rate of the glass fibers (y) was set to be 35 parts by mass by adjusting impregnation conditions and drawing conditions. The glass average fiber length in the obtained pellets was 10 mm being the same as the pellet length.

Physical properties of the respective pellets of manufacturing examples 1 to 9 obtained as described above were measured according to the following rules. Measurement results are indicated in following Table 1 as well.

[Measurement of Bending Modulus E and Maximum Bending Strain (Strain at Maximum Bending Strength) $\epsilon$]

Test pieces were prepared with injection molding by using an injection molding machine (S-2000i 100B manufactured by Fanuc Corporation) at a cylinder temperature of 290° C. and a mold temperature of 90° C. after drying the respective cut pellets. The bending modulus E and the maximum bending strain $\epsilon$ were measured by performing a bend test on the prepared test pieces according to ISO178.

[Average Fiber Length of Glass Fibers in Pellet]

A weighing bottle containing 10 g of pellets was incinerated in a carbonization oven at 600° C. for three hours. The weighing bottle subjected to the incineration was sufficiently cooled at room temperature. Subsequently, glass fibers were taken from residues in the weighing bottle. Then, 400 glass fibers were arbitrarily selected from the taken glass fibers. Fiber lengths of the selected glass fibers were measured with a microscope (VH-500 type manufactured by Keyence Corporation). Based on the measurement results, the average fiber length of the glass fibers was obtained from the following expression.

Average fiber length of glass fibers=$(L1+\ldots+L400)/400$

Here, Ln (n=1, ..., 400) denotes the fiber length of each glass fiber.

fitting was obtained. Next, the mold machine (i.e., the injection molding machine for sandwich molding) (J180AD-2M manufactured by The Japan Steel Works, Ltd.) for resin bracket molding was prepared as illustrated in FIG. 4. Then,

TABLE 1

|  |  | Manufacturing example 1 | Manufacturing example 2 | Manufacturing example 3 | Manufacturing example 4 | Manufacturing example 5 | Manufacturing example 6 | Manufacturing example 7 | Manufacturing example 8 | (Parts by mass) Manufacturing example 9 |
|---|---|---|---|---|---|---|---|---|---|---|
| Thermoplastic resin | PA66 | 65 | 30 | 70 | 35 | 90 | 67 | — | 65 | 50 |
|  | PA12 | — | 10 | 10 | — | — | — | — | — | — |
|  | PA6T | — | — | — | — | — | — | 50 | — | — |
| Inorganic filler | Glass fibers (x) | 35 | 60 | 20 | 65 | 10 | — | 50 | — | 50 |
|  | Glass fibers (y) | — | — | — | — | — | — | — | 35 | — |
|  | Carbon fibers | — | — | — | — | — | 33 | — | — | — |
| Bending modulus E (GPa) |  | 10 | 20 | 6.0 | 22 | 3.7 | 22 | 17 | 12 | 15 |
| Maximum bending strain ε (%) |  | 4.0 | 2.9 | 4.8 | 1.8 | 5.1 | 2.5 | 2.2 | 2.8 | 3.1 |
| E/ε |  | 2.5 | 6.9 | 1.3 | 12.2 | 0.7 | 8.8 | 7.7 | 4.3 | 4.8 |
| Pellet length |  | 3 mm | 3 mm | 3 mm | 3 mm | 3 mm | 3 mm | 3 mm | 10 mm | 3 mm |
| Average fiber length of glass fibers in pellet |  | 370 μm | 310 μm | 400 μm | 280 μm | 430 μm | 350 μm | 300 μm | 10 mm | 330 μm |

Next, a vibration damping device (i.e., an engine mount) including the rubber elastic body (i.e., the vulcanized rubber molding) and the resin bracket (i.e., the resin molding), which are integrated together, was manufactured as described below by using the pellets of the skin layer material and the pellets of the core layer material which are materials for forming the resin bracket.

Example 1

Preparation of Rubber Elastic Body Material

One hundred parts by mass of natural rubber is blended with 35 parts by mass of HAF carbon black (SEAST 3 manufactured by Tokai Carbon Co., Ltd.), 5 parts by mass of zinc oxide (Zinc Oxide Type-I manufactured by Sakai Chemical Industry Co., Ltd.), 2 parts by mass of stearic acid (LUNAC S-30 manufactured by Kao Corporation), 0.7 parts by mass of vulcanizing accelerator (SOXINOL CZ manufactured by Sumitomo Chemical Co., Ltd.) and 2 parts by mass of sulfur (SULFAX 200S manufactured by Tsurumi Chemical Industry Co., Ltd.). The rubber elastic body material (i.e., the rubber composition) was prepared by kneading the formulation formed as described above by using a kneader and a mixing mill.

(Manufacture of Vibration Damping Device)

To manufacture the present engine mount as illustrated in FIGS. 1 to 3, a cylindrical hardware fitting made of iron with outer diameter of 24 mm, inner diameter of 12 mm and length of 60 mm was prepared. Then, adhesive was applied to the outer peripheral surface (i.e., a portion to be in close contact with the rubber elastic body) of the cylindrical hardware fitting. Subsequently, the cylindrical hardware fitting is placed at a predetermined position in a mold for the rubber elastic body. Then, the rubber elastic body material was injected into the mold. Subsequently, the rubber elastic body material was vulcanized at 150° C. for 30 minutes. Thus, the rubber elastic body integrated with the cylindrical hardware fitting was obtained. Next, adhesive was applied to the outer peripheral surface (i.e., a portion to be in close contact with the resin bracket) of the rubber elastic body. Subsequently, the resultant was placed at a predetermined position in the mold along with the nuts. Then, the pellets (i.e., manufacturing example 1) being the skin layer material were injected into the cavity of the mold from the skin layer cylinder via the skin layer nozzle. Subsequently, the pellets (i.e., manufacturing example 2) being the core layer material were injected into the cavity of the mold from the core layer cylinder via the core layer nozzle. Here, the cylinder temperature was 290° C. and the mold temperature was 80° C. Thus, the core layer was molded. In this manner, the vibration damping device (i.e., the engine mount) in which the rubber elastic body (i.e., the vulcanized rubber molding) and the resin bracket (i.e., the resin molding) were integrated was manufactured. The section of the resin bracket (e.g., depth 50 mm, width 120 mm, and height 100 mm) of the vibration damping device (i.e., the engine mount) has the sandwich structure as illustrated in FIG. 3. In this structure, the outer circumference of the core layer (e.g., thickness 4 mm) is covered with the skin layer (e.g., thickness 3 mm)

Examples 2 to 8 and Comparative Example 1 to 6

Preparation of Rubber Elastic Body Material

The rubber elastic body material (i.e., the rubber composition) was prepared similarly to example 1.
(Manufacture of Vibration Damping Device)

The vibration damping device was manufactured according to example 1 except for variation of combination between the pellets of the skin layer material and the pellets of the core layer material as indicated in following Tables 2 and 3.

The section of the resin bracket (e.g., depth 50 mm, width 120 mm, and height 100 mm) of the vibration damping device (i.e., the engine mount) has the sandwich structure. In this structure, the outer circumference of the core layer (e.g., thickness 4 mm) is covered with the skin layer (e.g., thickness 3 mm)

TABLE 2

|  | Example 1 | Example 2 | Example 3 | Example 4 | Example 5 | Example 6 | Example 7 | Example 8 |
|---|---|---|---|---|---|---|---|---|
| Skin layer (Pellets) | Manufacturing example 1 | Manufacturing example 3 | Manufacturing example 1 | Manufacturing example 2 | Manufacturing example 1 | Manufacturing example 1 | Manufacturing example 1 | Manufacturing example 1 |
| Core layer (Pellets) | Manufacturing example 2 | Manufacturing example 2 | Manufacturing example 7 | Manufacturing example 6 | Manufacturing example 8 | Manufacturing example 9 | Manufacturing example 2 | Manufacturing example 2 |
| $E1/\epsilon1$ | 2.5 | 1.3 | 2.5 | 6.9 | 2.5 | 2.5 | 2.5 | 2.5 |
| $E2/\epsilon2$ | 6.9 | 6.9 | 7.7 | 8.8 | 4.3 | 4.8 | 6.9 | 6.9 |
| $\epsilon1/\epsilon2$ | 1.4 | 1.7 | 1.8 | 1.2 | 1.4 | 1.3 | 1.4 | 1.4 |
| Breaking strength (kN) | 45 | 42 | 44 | 44 | 47 | 43 | 43 | 42 |
| Volume ratio of skin layer (%) | 50 | 45 | 50 | 50 | 50 | 50 | 40 | 70 |

TABLE 3

|  | Comparative example 1 | Comparative example 2 | Comparative example 3 | Comparative example 4 | Comparative example 5 | Comparative example 6 |
|---|---|---|---|---|---|---|
| Skin layer (Pellets) | Manufacturing example 2 | Manufacturing example 1 | Manufacturing example 1 | Manufacturing example 1 | Manufacturing example 5 | Manufacturing example 7 |
| Core layer (Pellets) | Manufacturing example 1 | Manufacturing example 2 | Manufacturing example 2 | Manufacturing example 4 | Manufacturing example 2 | Manufacturing example 1 |
| $E1/\epsilon1$ | 6.9 | 2.5 | 2.5 | 2.5 | 0.7 | 7.7 |
| $E2/\epsilon2$ | 2.5 | 6.9 | 6.9 | 12.2 | 6.9 | 2.5 |
| $\epsilon1/\epsilon2$ | 0.7 | 1.4 | 1.4 | 2.2 | 1.8 | 0.6 |
| Breaking strength (kN) | 37 | 39 | 36 | 40 | 33 | 34 |
| Volume ratio of skin layer (%) | 50 | 30 | 80 | 50 | 50 | 50 |

Characteristics of the vibration damping devices of examples and comparative examples obtained as described above were measured according to the following rules. Measurement results were indicated in the above Tables 2 and 3 as well.

[Breaking Strength]

The vibration damping device was fixed to a jig. A metal round bar was inserted into the cylindrical hardware fitting of the vibration damping device. The inserted round bar was pulled upward in FIG. 2 at speed of 20 mm/min until the vibration damping device was broken. Then, under environment of ordinary temperature (i.e., 20° C.), the load at the time of breakage was measured by using a tensile test machine (Auto-Graph AG-IS manufactured by Shimadzu Corporation).

[Volume Ratio of Skin Layer]

Injection volume of the skin layers (i.e., the primary material) and injection volume of the core layer (i.e., the secondary material) of the sandwich molding were measured with the injection molding machine. The volume ratio of the skin layers (i.e., the primary material) was obtained as follows. That is, the total volume was calculated as addition of the injection volume of the primary material and the injection volume of the secondary material which were measured by the injection molding machine. The ratio of the injection volume of the primary material relative to the total volume was obtained as the volume ratio of the primary material.

Here, the injection volume of the primary material and the injection volume of the secondary material were calculated respectively as a product of screw movement distance during injection molding and cylinder section area. Further, the screw movement distance during injection molding was calculated as a difference between the screw position at the time of measurement completion and the screw position at the time of injection completion. The volume ratio of the skin layers is preferably in the range of 40 to 70% of the entire sandwiched molding.

The following were found through the results of FIGS. 2 and 3. Examples 1 to 8 respectively adopt the resin bracket which includes a sandwiched molding with the core layer including a specified resin composition and the skin layers including a specified resin composition to sandwich the core layer as the volume ratio of the skin layers being in a specified range. Accordingly, the breaking strength of every example was excellent.

Here, the inventors confirmed followings from experiment. That is, it is also possible to utilize thermoplastic resins such as PBT, PPS, SPS, PPE, and maleic anhydride denatured polyphenylene ether (MA-PPE) instead of the thermoplastic resins (e.g., PA66, PA12 and PA6T) which were used in the above examples. Other examples obtained by using the above kinds of thermoplastic resins provide excellent effects approximately similar to those of the examples using a polyamide resin (e.g., PA66).

On the other hand, in comparative examples 1 and 6, $E1/\epsilon1$ exceeded $E2/\epsilon2$ and the breaking strength thereof was inferior.

In comparative example 2, the volume ratio of the skin layers fell below a specified value and the breaking strength thereof was inferior.

In comparative example 3, the volume ratio of the skin layers exceeded a specified value and the breaking strength thereof was inferior.

In comparative example 4, $E2/\epsilon2$ exceeded a specified value and the breaking strength was inferior.

In comparative example 5, $E1/\epsilon1$ fell below a specified value and the breaking strength was inferior.

The above examples indicate specific embodiments of the present disclosure. Here, since the above examples are simply exemplary, the disclosure should not be construed in a limited manner. Further, any modification falling in the scope of equivalence of any one of the claims is still within the present disclosure.

The vibration damping device according to the present disclosure is preferably used as a vibration damping device for vehicles such as automobiles, such as an engine mount, a transmission mount, a body mount, a cab mount, a member mount, a differential mount, a con rod, a torque rod, a strut bar cushion, a center bearing support, a torsional damper, a steering rubber coupling, a tension rod bush, a bush, a bound stopper, an FF engine roll stopper, a muffler hanger, a stabilizer link rod, a radiator support, a control arm, and a suspension arm to be used in vehicles such as automobiles. Further, the vibration damping device according to the present disclosure may be used as a vibration damping device for other than vehicles such as automobiles.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A vibration damping device, comprising:
 a vulcanized rubber molding having a vibration isolating function,
 a resin molding integrally formed with the vulcanized rubber molding fixed to a base body while supporting the vulcanized rubber molding,
 wherein the resin molding includes a sandwiched molding having a core layer and skin layers sandwiching the core layer,
 a first resin composition (A) included in the skin layers, which includes a first thermoplastic resin and an inorganic filler,
 a second resin composition (B) included in the core layer, which includes a second thermoplastic resin and an inorganic filler, wherein
 a volume ratio of the skin layers is in a range of 40% to 70% of the entire sandwiched molding, and wherein
 a bending modulus (E1) of the skin layers, a maximum bending strain ($\epsilon 1$) of the skin layers, a bending modulus (E2) of the core layer, and a maximum bending strain ($\epsilon 2$) of the core layer satisfy the following expressions (1) and (2):

$$1<(E1/\epsilon 1)<(E2/\epsilon 2)<10 \qquad (1)$$

$$\epsilon 1/\epsilon 2 >1 \qquad (2).$$

2. The vibration damping device according to claim 1, wherein the first thermoplastic resin and the second thermoplastic resin are polyamide resins, respectively.

3. The vibration damping device according to claim 1, wherein the inorganic filler includes at least one of glass fibers and carbon fibers.

4. The vibration damping device according to claim 2, wherein the inorganic filler includes at least one of glass fibers and carbon fibers.

5. The vibration damping device according to claim 1, wherein the skin layers include glass fibers (x) of 100 μm to 500 μm in average fiber length, and wherein
the core layer includes glass fibers (y) of 0.5 mm to 5 mm in average fiber length, and where the average fiber length of the glass fibers (y) is larger than the average fiber length of the glass fibers (x).

6. The vibration damping device according to claim 2, wherein the skin layers include glass fibers (x) of 100 μm to 500 μm in average fiber length, and wherein
the core layer includes glass fibers (y) of 0.5 mm to 5 mm in average fiber length, where the average fiber length of the glass fibers (y) is larger than the average fiber length of the glass fibers (x).

7. The vibration damping device according to claim 3, wherein the skin layers include glass fibers (x) of 100 μm to 500 μm in average fiber length, and wherein
the core layer includes glass fibers (y) of 0.5 mm to 5 mm in average fiber length, where the average fiber length of the glass fibers (y) is larger than the average fiber length of the glass fibers (x).

8. The vibration damping device according to claim 4, wherein the skin layers include glass fibers (x) of 100 μm to 500 μm in average fiber length, and wherein
the core layer includes glass fibers (y) of 0.5 mm to 5 mm in average fiber length, where the average fiber length of the glass fibers (y) is larger than the average fiber length of the glass fibers (x).

* * * * *